United States Patent [19]
Schmidt et al.

[11] Patent Number: 6,141,868
[45] Date of Patent: Nov. 7, 2000

[54] APPARATUS FOR PRESS-IN ATTACHMENT OF SUSPENSION ASSEMBLY IN HARD DISK DRIVE

[75] Inventors: Ryan Schmidt; Kevin Hanrahan; Steve Braunheim, all of Santa Barbara, Calif.

[73] Assignee: Intri-Plex Technologies, Inc., Santa Barbara, Calif.

[21] Appl. No.: 09/003,872

[22] Filed: Jan. 7, 1998

[51] Int. Cl.[7] ........................................ G11B 5/42
[52] U.S. Cl. ............................ 29/757; 29/253; 29/525; 29/603.03; 29/760
[58] Field of Search ............................. 29/603.03, 603.04, 29/253, 525, 757, 760; 360/104–106

[56] References Cited

U.S. PATENT DOCUMENTS

| | | | |
|---|---|---|---|
| 311,769 | 2/1885 | Mackay | 29/253 |
| 1,425,426 | 8/1922 | Vogt, Jr. | 29/243.518 |
| 2,394,341 | 2/1946 | Strong | 29/237 |
| 2,862,757 | 12/1958 | Hutchinson | 294/94 |
| 3,670,113 | 6/1972 | Bragas | 179/100.2 B |
| 4,821,391 | 4/1989 | Paterick | 29/253 |
| 5,132,857 | 7/1992 | Russell-Smith et al. | 360/104 |
| 5,203,063 | 4/1993 | Bonani et al. | 29/258 |
| 5,265,325 | 11/1993 | Fortin | 29/742 |
| 5,860,206 | 1/1999 | Tochiyama | 29/603.04 |
| 5,879,115 | 3/1999 | Medal | 411/82 |

*Primary Examiner*—Carl E. Hall
*Attorney, Agent, or Firm*—Owen L. Lamb

[57] ABSTRACT

A method of and apparatus for assembling a disk drive. The method comprises steps of clamping a number of head suspension assemblies in an actuator body such that base plate hubs in the suspensions are in alignment with corresponding boss holes in actuator arms extending from the actuator body, inserting closed jaws between the actuator arms and in alignment with the base plates, and opening the jaws a reach sufficient to urge each base plate hub into a corresponding boss hole. The jaws are opened by any suitable mechanism, for example by driving a wedge in between the closed jaws. A novel apparatus is employed for joining base plate hubs to actuator arms extending from an actuator body. The apparatus includes an actuator body clamp adapted to hold a number of suspensions in the actuator body, with hubs of the suspensions in alignment with boss holes in the actuator arms. A jaw shaped tool fitted to dimensions of spaces between the actuator arms and a wedge shaped tool having appropriate dimensions so as to open the jaws are employed. The jaws have a reach sufficient to urge a base plate hub into an actuator arm boss hole.

17 Claims, 3 Drawing Sheets

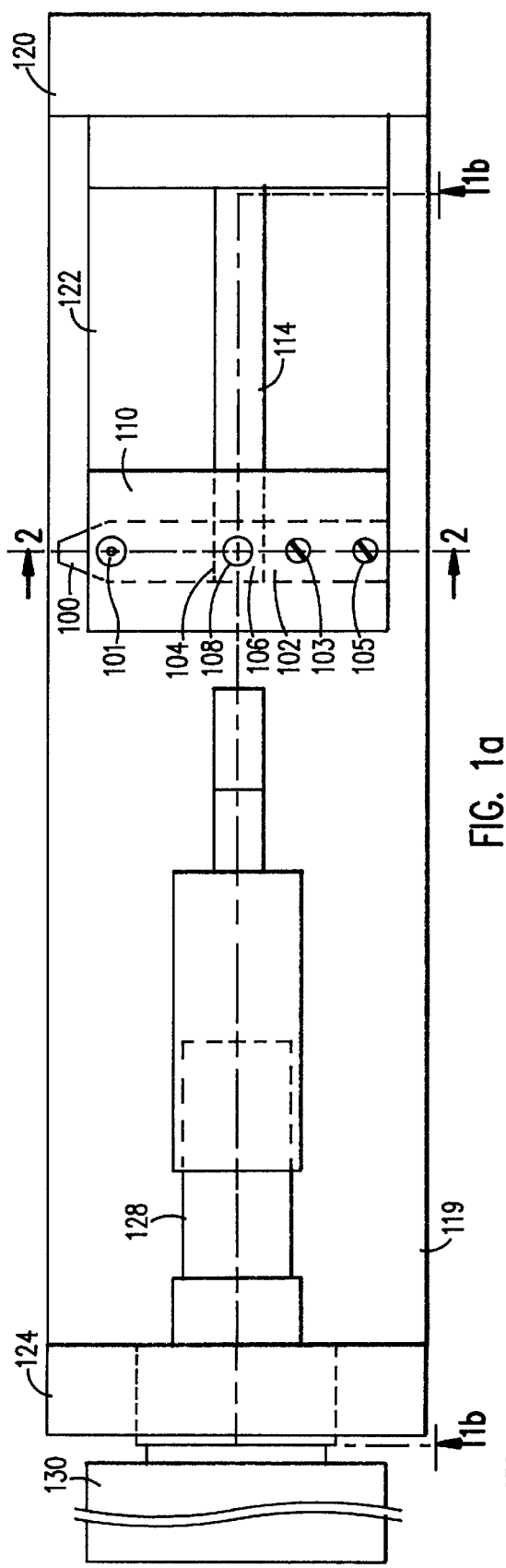
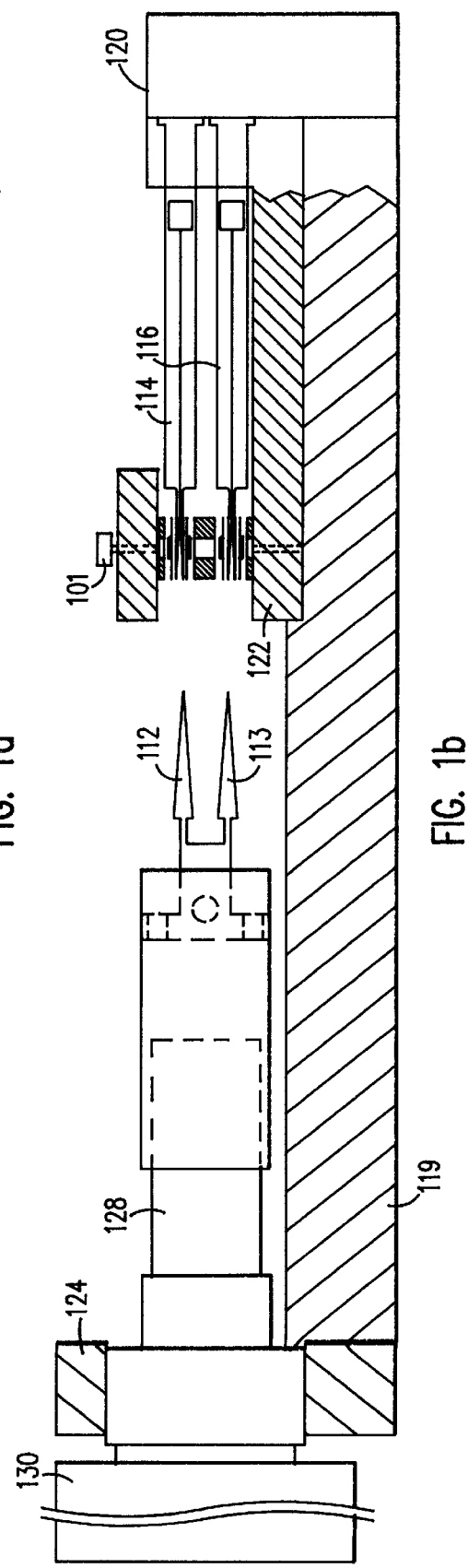
FIG. 1a
FIG. 1b

APPARATUS FOR PRESS-IN ATTACHMENT OF SUSPENSION ASSEMBLY IN HARD DISK DRIVE

CROSS-REFERENCE TO RELATED APPLICATION

The invention is related to application Ser. No. 09/003,871 filed Jan. 7, 1998 on behalf of Ryan Schmidt, et al. entitled "Base Plate With Pronged Hub For Press-In Attachment Of Suspension Assembly In Hard Disk Drive"; copending application Ser. No. 09/002,068 filed Jan. 7, 1998 on behalf of Ryan Schmidt, et al. entitled "Base Plate With Toothed Hub For Press-In Attachment Of Suspension Assembly In Hard Disk Drive"; and application Ser. No. 08/943377 filed Oct. 3, 1997, now U.S. Pat. No. 6,069,772 on behalf of Steve Braunheim, et al. entitled "Base Plate For Magnetic Head Suspension In Hard Disk Drive With Material Fold-Over", all assigned to the same assignee as the present invention, which applications are incorporated herein by reference.

BACKGROUND OF THE INVENTION

1. Field of the Invention

This invention relates to disk head assemblies for supporting read/write heads adjacent rotating disks in disk drives and more particularly, to a method and apparatus for pressing base plates into actuator arms.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram load". Air turbulence caused by the rotating disks lifts the heads slightly off of the disks so that the heads fly on an air bearing across the disk surfaces. The air bearing force is counteracted by the suspension gram load.

A head-carrying suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. The combined base plate, load beam and a flexure make up a head suspension, and the suspension has the hub of the base plate extending through and beyond the load beam clearance hole.

The hubs of two suspensions are inserted into an actuator arm boss hole formed through an actuator arm extending from an actuator body, one hub entering an actuator arm boss hole from each end of the hole. In the prior art, a swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

Problems with this method of mounting transducer heads have arisen as the need for increased data storage capacity in hard disk drives has grown and the size of the disk drive has decreased to fit in small lap top computers. The problem of forming a strong connection between the actuator arms and the transducer suspensions has been made more difficult as the thickness of the components has become smaller.

Because of the joining of two transducer suspensions to an actuator arm by passing a swage ball through two hubs in the same hole in the actuator arm, an asymmetry exists in the forces that are exerted on the hubs to make the joints. Because the transducer heads face in opposite directions, the suspensions and therefore the hubs on their respective load beams also extend in opposite directions with respect to the direction of passage of the ball through the inner diameters of the hubs. For one transducer suspension, the ball is passed in a direction that tends to place the hub in compressive stress while, for the other transducer suspension, the direction of passage of the ball is such as to tend to place the hub in tensile stress. In order to achieve a permanent bond between the hub and the actuator, the passage lo of the ball must cause permanent, or plastic, deformation of the hub. This deformation often causes a change in shape of the flange portion of the base plate, is which results in a change in the suspension gram load. The differences in shape changes and stresses between the suspensions swaged in tension and compression causes differences in gram load change and hub/actuator joint integrity between these up and down facing suspensions.

It is an object of this invention to provide a method and apparatus for use in assembling a disk drive that eliminates the need for swaging and the resulting up and down facing head pre-load and joint integrity differences.

It is also an object of this invention to provide a method and apparatus for use in assembling a disk drive that presses base plates into actuator arms thereby creating a press fit.

It is also an object of this invention is to provide a method and apparatus for use with novel base plates that can be pressed into an actuator arm to create a press fit.

The above-referenced co-pending application Ser. No. 09/003,871 discloses a novel base plate for press fitting into a boss hole of a predetermined nominal diameter. The base plate has a flange and a hub extending from a region at which the hub meets the flange to an outer end of the hub. The hub has a number of vertical slots cut through the hub extending from the outer end of the hub part way or all the way to the region at which the hub meets the flange, a space between slots determining boundaries of a prong. The hub has an outer diameter which is greater than the predetermined nominal diameter. Alternatively the hub has an outer diameter at the region at which the hub meets the flange which is not greater than the predetermined nominal diameter, in which case each prong extends outward to a prong outer diameter which is greater than the predetermined nominal diameter. Also the base plate may have a corner relief that circumscribes the region at which the hub meets the flange.

The above-referenced co-pending application Ser. No. 09/002,068 also discloses a base plate for press fitting into an actuator arm boss hole of a predetermined nominal diameter. In this instance, the hub has a number of vertical teeth protruding from the hub extending from the outer end of the hub to the region at which the hub meets the flange. The hub has an outer diameter which is greater than the predetermined nominal diameter of the actuator arm boss hole. A corner relief may be provided that circumscribes the region at which the hub meets the flange.

Copending application Ser. No. 08/943377 discloses a base plate that has a flange and a hub that is formed with a fold portion extruded from the flange which extends beyond an outer diameter of the hub to form a barb. Since the fold extends outward to increase the outer diameter of the hub by forming a barb, this allows a press fit, thrusting the barb into the arm material, thereby eliminating the need to swage.

As more fully described in the above identified copending applications, the base plates are designed to be pressed into tight engagement with the inner peripheries of an actuator arm boss hole without swaging. An actuator body with arms extending therefrom resembles the letter "E" and hence is called an "E-block". In practice, a disk drive will have several actuator arms, with the hubs of two suspensions inserted into actuator arm boss holes formed through a plurality of actuator arms extending from the actuator body. In the middle arms of the actuator, one hub enters an actuator arm boss hole from each end of the hole. Therefore, an actuator arm may carry two suspensions on opposite sides thereof to support two transducer heads in opposing directions, one up and one down.

It is therefore also an object of this invention is to provide method and apparatus for use with base plates that can be pressed into actuator arms of an actuator body to create a press fit.

SUMMARY OF THE INVENTION

Briefly, the invention is concerned with a method of assembling a disk drive. The method comprises steps of clamping an actuator body in place in a fixture to prevent outward bending of the outermost actuator arms, placing a number of head suspension assemblies in the actuator body such that base plate hubs in the suspensions are in alignment with corresponding boss holes in actuator arms extending from the actuator body, radially aligning the head suspension assemblies with a pin that passes through tooling holes in the suspensions and into the fixture, inserting a tool between the actuator arms and in alignment with the base plates, and activating the tool a reach sufficient to urge each base plate hub into a corresponding boss hole.

In accordance with a preferred embodiment of the invention, the tool comprises closed jaws and the tool is activated by opening the jaws by, for example, driving a wedge between the closed jaws.

In accordance with an aspect of the invention, a novel apparatus for joining base plate hubs to actuator arms extending from an actuator body is provided. The apparatus includes a clamp assembly to locate and constrain an actuator body that holds a number of suspensions, with the hubs of the suspensions in alignment with boss holes in the actuator arms, a jaw shaped tool fitted to dimensions of spaces between the suspensions and actuator arms; and, a wedge shaped tool having appropriate dimensions so as to open the jaws, the jaws having a reach sufficient to urge a base plate hub into an actuator arm boss hole.

An advantage of this invention is that it allows the use of base plates to connect head suspensions to actuator arms of a head stack assembly without swaging or plastically deforming the stainless steel hub portion of the base plate to create a press fit into the actuator arm.

The invention has the advantage that press-in base plates reduce the large stresses and deformations associated with swaging that result in gram load change.

The invention has the further advantage that press-in base plates eliminate the gram load change difference that occurs between up and down heads resulting from the different mechanics of conventional tension and compression swaging.

The invention has the further advantage that high integrity joints can be formed between the actuator and the head suspension assemblies, even with low hub height base plates.

BRIEF DESCRIPTION OF THE DRAWINGS

FIG. 1a is a top view of a machine of the present invention;

FIG. 1b is a side elevation view of the machine of FIG. 1a along view line 1b—1b;

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 2:
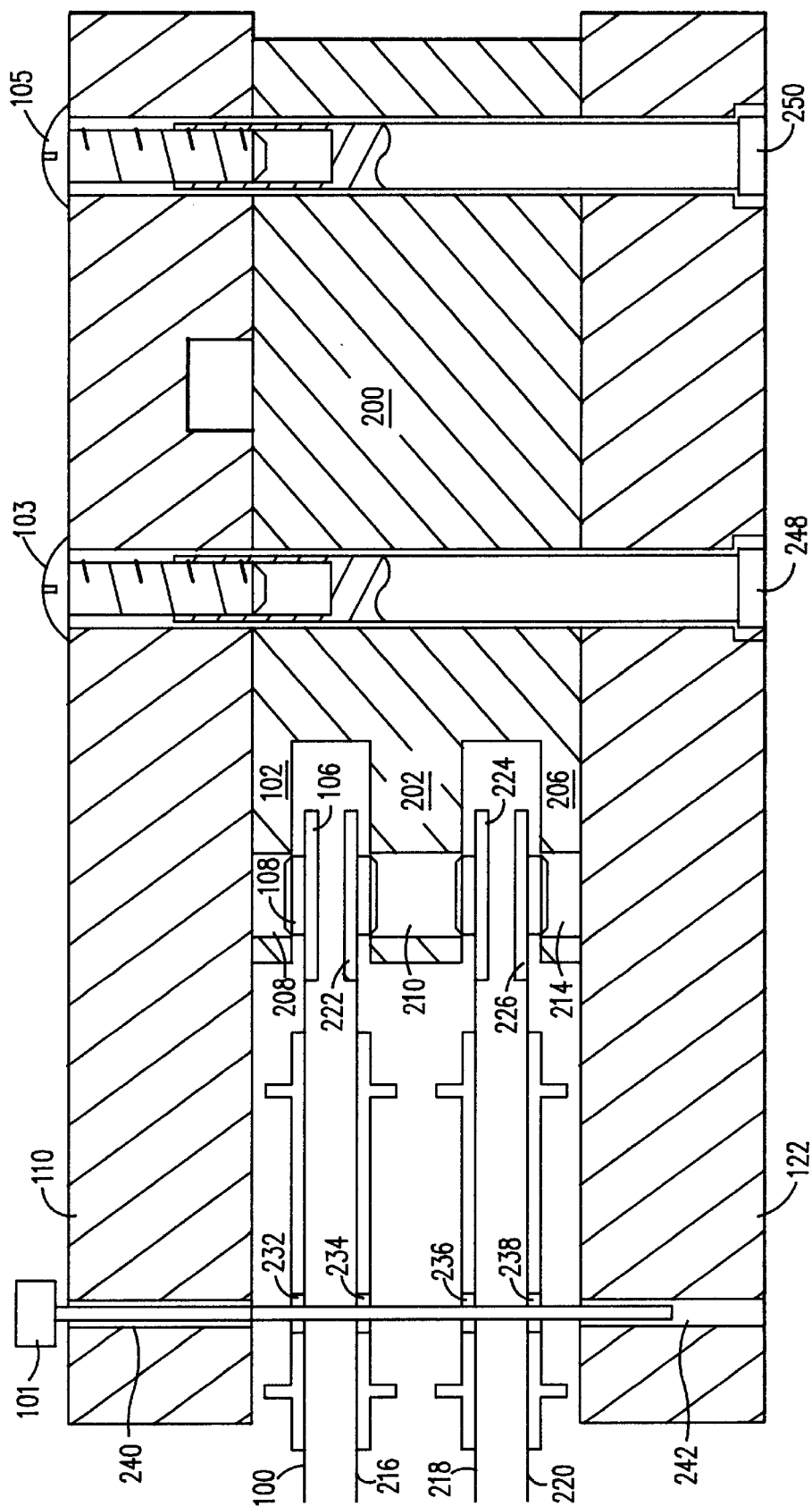
FIG. 2 is a detail showing the clamped actuator body of FIG. 1a and 1b along view line 2—2.

Refer to FIGS. 1a and 1b which illustrate an apparatus for pressing base plate hubs into an actuator body having one or more fixed spaced actuator arms, without bending the arms. A head suspension 100 and actuator arm 102 are connected end to end by a base plate 104. The base plate 104 includes a flat flange portion 106 and a cylindrical hub portion or boss 108. In assembling the suspensions, the hub of a base plate is inserted through a load beam clearance boss hole in a corresponding load beam which is part of a suspension and the flange portion of the base plate is welded to the load beam. The hub of each suspension, which extends beyond the load beam, and which is slightly larger in diameter than the actuator arm boss hole, will be pressed into an actuator arm boss hole in an actuator arm. The suspensions are initially held in place by the closed jaws that are slid between them, by rough location of the hubs in the entrances of the actuator arms boss holes, and by an alignment pin 101 which passes through suspension tooling holes, and alignment pin holes in the fixture. The actuator body is clamped in the fixture by clamp screws 103, 105, which are threaded into corresponding clamp bolts.

In FIG. 1b three such actuator arms are shown, Two jaws, 114, 116 are held rigidly in place by a back panel 120 that is secured to a base 122. Two wedges 112, 113 are attached to a moveable shaft 128. The shaft 128 is part of a pneumatic piston motor 130 that is rigidly connected to a front panel 124. A first blast of air supplied to the piston motor 130 through a first air input will cause the shaft to move to the right until equilibrium is reached between the horizontal shaft force and the resultant horizontal forces generated in the jaw and wedge interface. A return spring or a second blast of air supplied to the piston motor 130 through a second air input will cause the shaft to return to the left.

FIG. 2 illustrates a cross-section along view lines 2—2 of FIG. 1a and 1b. The actuator body 200 is made up of three actuator arms, 102, 202, 206. Each actuator arm has a boss hole, 208, 210, 214 through it. Each load beam of suspensions 100, 216, 218, 220 has a corresponding base plate, 106, 222, 224, 226 welded to it. In FIG. 2 the base plates are shown in position prior to being press fitted into boss holes 208, 210, 214 in the actuator arms. The base plates are shown with beveled edges at the extreme end of their hubs to assist in positioning with respect to the boss holes. The suspensions are held in place by the closed jaws that are slid between them (not shown), by rough location of the hubs in the entrances of the actuator arms boss holes, and by an alignment pin 101 that passes through suspension tooling holes 232, 234, 236, 238, and alignment pin holes 240, 242, in the fixture 110, 122. The actuator body is clamped in the fixture by clamp screws 103,105, which are threaded into corresponding clamp bolts 248,250.

To summarize, the actuator body 200 is clamped in a fixture 110 ,122 that prevents outward bending of actuator arms 102, 202, 206 of the actuator body. A number of head suspension assemblies 100, 216, 218, 220, are located in the actuator body such that base plate hubs of base plates 106, 222, 224, 226 in the suspensions are in alignment with corresponding boss holes 208, 210, 214 in the actuator arms. The boss holes are smaller than the outside diameters of the base plate hubs. The head suspensions are radially aligned by the alignment pin 101 that passes through suspension tooling holes 232, 234, 236, 238, and alignment pin holes 240, 242, in the fixture 110, 122.

A method for press fitting a stack of head support assemblies to actuator arms is as follows. An actuator body 200 is clamped in a fixture 110,122, that prevents outward bending of actuator arms 102, 202, 206, of the actuator body. A number of head suspension assemblies 100, 216, 218, 220, are located in the actuator body such that base plate hubs in the suspensions are in alignment with corresponding boss holes 208, 210, 214, in the actuator arms and such that the head suspensions are radially aligned. A tool is inserted between the actuator arms and opposing head suspension base plate pairs in alignment with the base plates. The tool is activated a reach sufficient to urge each base plate hub into a corresponding boss hole that is smaller than the base plate hub outside diameter to create a press fit between a corresponding head suspension and actuator arm. In the preferred embodiment closed jaws 114,116, are inserted between the actuator arms and in alignment with the base plates and wedges 112, 113, are driven between the jaws, opening the jaws a reach sufficient to urge each base plate hub into a corresponding boss hole.

Figure 3A:
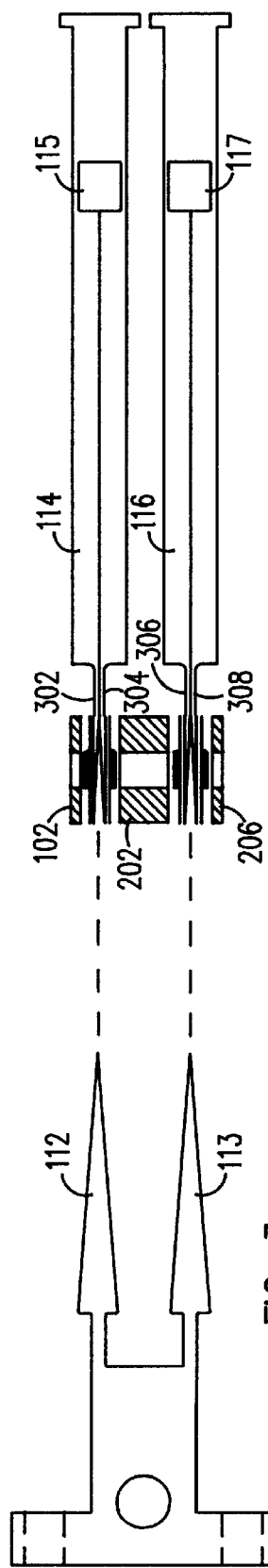
FIG. 3a is a detail illustrating the wedge and jaws in the initial disengaged position.
Figure 3B:
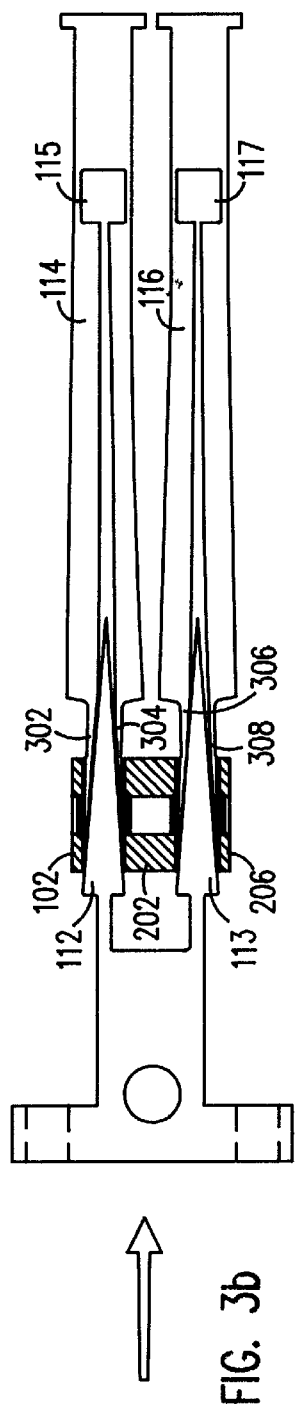
FIG. 3b is a detail illustrating the wedge and jaws in the engaged position; and, FIG. 3c is a detail illustrating the wedge and jaws in the final disengaged position.
Figure 3C:
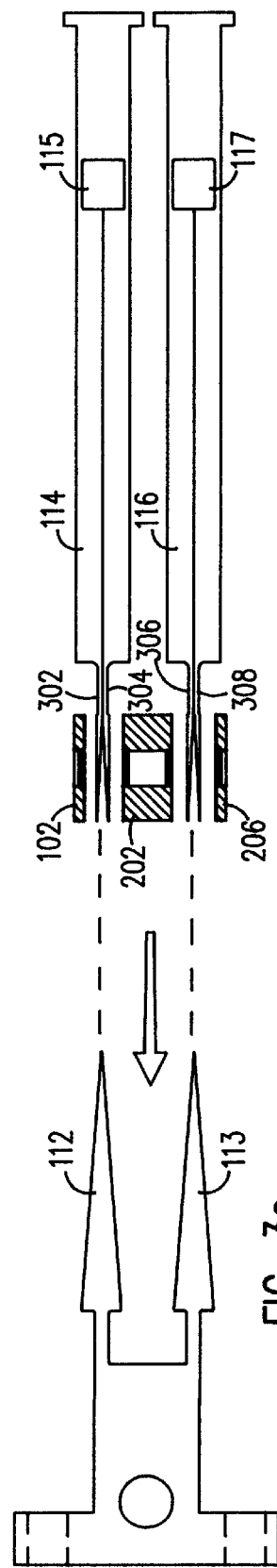

As illustrated in FIG. 3a, initially, the jaws 114, 116, are closed and the wedges 112, 113, are in a retracted position. As illustrated in FIG. 3b, the wedge shaped tool 112, 113 is moved in the direction of the arrow to engage the jaws, forcing the jaws open a reach sufficient to urge each base plate hub into a corresponding boss hole. When in contact with a base plate, the shape of that portion of a jaw that contacts the flat surface of the flange portion of the base plate is such that the jaw is parallel to and conforms with the flat flange. This achieves uniform pressure against the flange. The wedge shaped tool 112, 114 causes pressure to be applied through the jaws to the flanges of the base plates to cause the hubs to be press fitted into the boss holes in the actuator arms, rigidly connecting the hubs and attached load beams to the actuator arm boss holes. Reliefs 115, 117, 302, 304, 306, 308, built into the jaws allow the jaws to bend and conform to the flat actuator arms that the base plates are being pressed into, forcing the suspensions to mate flat to the actuator arms. The vertical press-in forces generated by the wedging action are counteracted by the upper and lower clamp plates 110, 122, which prevent the outer arms from bending outwards.

Finally, in FIG. 3b, the wedge shaped tool 112, 114 is retracted in the direction of the arrow to disengage the jaws.

The jaws being spring loaded return to the closed position making it possible to remove the jaws from in-between the actuator arms of the completed assembly.

The invention has been described by illustrating an actuator body that has three actuator arms, resembling the letter "E". It will be understood that the invention can be practiced with respect to other actuator body configurations such as, but not limited to, a single arm with one suspension; a single arm with two suspensions, two arms, three or more arms, etc. In an E-block configuration, the outermost arms when clamped act as a constraint against the forces exerted by the press-in tool. In configurations that do not have outer actuator arms (such as an actuator body with only one arm) a suitable constraint in the clamping fixture can be easily provided.

It will be understood that any suitable means may be employed to create equal and opposite forces on base plate pairs to cause the press in attachment, such as, but not limited to rotary force, leverage, torque, lift, piezo-electric action, cam action, hydraulic action, pneumatic action, electromechanical means, etc. For example, making the jaws part of a scissors and leveraging the scissors to open the jaws, threading the jaws and using torque to open the jaws, lifting the jaws, raising the jaws, opposing hydraulic pistons, or piezo-electric action.

Because the press-in process utilizes equal and opposite forces on opposing head suspensions, and because the press-in process is mechanically equivalent for up and down facing heads, there is no residual stress or final shape asymmetry between the up and down facing head suspensions. Therefore, there are no significant gram load changes or joint integrity differences between the up and down facing head suspensions as there are in a conventional swaging process.

While the invention has been particularly shown and described with reference to preferred embodiments thereof, it will be understood by those skilled in the art that the foregoing and other changes in form and detail may be made therein without departing from the scope of the invention.

What is claimed is:

1. In an apparatus in which an actuator body is clamped in a fixture that prevents outward bending of actuator arms of said actuator body, in which a number of head suspension assemblies are located in said actuator body such that base plate hubs in said suspensions are in alignment with corresponding boss holes in said actuator arms and such that said head suspensions are radially aligned, said boss holes being smaller than outside diameters of said base plate hubs;

an improvement comprising:
inserting means for inserting a tool between said actuator arms and opposing head suspension base plate pairs and in alignment with said base plates; and,
activating means for activating said tool a reach sufficient to urge each base plate hub into a corresponding boss hole.

2. The apparatus of claim 1 wherein:
said inserting means includes jaws.

3. The apparatus of claim 2 further comprising:
opening means for opening said jaws a reach sufficient to urge each base plate hub into a corresponding boss hole.

4. The apparatus of claim 3 wherein said opening means is a wedge.

5. In an apparatus in which an actuator body is clamped in a fixture that prevents outward bending of actuator arms of said actuator body, in which a number of head suspension assemblies are located in said actuator body such that base plate hubs in said suspensions are in alignment with corresponding boss holes in said actuator arms and such that said head suspensions are radially aligned, said boss holes being smaller than outside diameters of said base plate hubs;

an improvement comprising:

a tool located between said actuator arms and opposing head suspension base plate pairs and in alignment with said base plates; and, a tool activator;

said tool having, upon activation by said tool activator, a reach sufficient to urge each base plate hub into a corresponding boss hole.

6. The apparatus of claim 5 wherein:

said tool includes jaws.

7. The apparatus of claim 6 wherein:

said tool activator is a wedge.

8. An apparatus comprising:

clamping means for clamping an actuator body in a fixture that prevents outward bending of actuator arms of said actuator body;

locating means for locating a number of head suspension assemblies in said actuator body such that base plate hubs in said suspensions are in alignment with corresponding boss holes in said actuator arms and such that said head suspensions are radially aligned;

inserting means for inserting a tool between said actuator arms and opposing head suspension base plate pairs in alignment with said base plates; and, activating means for activating said tool a reach sufficient to urge each base plate hub into a corresponding boss hole that is smaller than the base plate hub outside diameter to create a press fit connection between a corresponding head suspension and actuator arm.

9. The apparatus of claim 8 wherein:

said inserting means includes jaws.

10. The apparatus of claim 9 further comprising:

opening means for opening said jaws a reach sufficient to urge each base plate hub into a corresponding boss hole, said boss hole being smaller than an outside diameter of said base plate hub.

11. The apparatus of claim 10 wherein said opening means is a wedge.

12. An apparatus comprising:

a clamping fixture that prevents outward bending of actuator arms of an actuator body in which a number of head suspension assemblies in said actuator body are located such that base plate hubs in said suspensions are in alignment with corresponding boss holes in said actuator arms and such that said head suspensions are radially aligned;

a tool;

said tool being located between said actuator arms and opposing head suspension base plate pairs and in alignment with said base plates; and, a tool activator, said tool having, upon activation by said tool activator, a reach sufficient to urge each base plate hub into a corresponding boss hole, said boss hole being smaller than an outside diameter of said base plate hub.

13. The apparatus of claim 12 wherein:

said tool includes jaws.

14. The apparatus of claim 13 wherein:

said tool activator is a wedge.

15. An apparatus for joining base plate hubs to a number of actuator arms extending from an actuator body comprising:

an actuator body fixture;

said actuator body fixture being adapted to hold a plurality of suspensions in said actuator body, with hubs of said suspensions in alignment with boss holes in said actuator arms and such that said head suspensions are radially aligned;

a tool;

said tool being fitted to dimensions of spaces between said actuator arms; and, a tool activator;

said tool activator having appropriate dimensions so as cause said tool to attain a reach sufficient to urge a base plate hub into an actuator arm boss hole, said boss hole being smaller than an outside diameter of said base plate hub.

16. The apparatus of claim 15 wherein:

said tool includes jaws.

17. The apparatus of claim 16 wherein:

said tool activator is a wedge.

\* \* \* \* \*